United States Patent [19]

Berry et al.

[11] Patent Number: 4,732,370

[45] Date of Patent: Mar. 22, 1988

[54] SELF CONTAINED DOUBLE O'RING SLIP JOINT AND QUICK DISCONNECT LANCE

[76] Inventors: William W. Berry, 8092 Regency Dr., Pittsburgh, Pa. 15237; Nicholas M. Rymarchyk, P.O. Box 284, Zelienople, Pa. 16063

[21] Appl. No.: 886,398

[22] Filed: Jul. 17, 1986

[51] Int. Cl.⁴ .................................................. C21C 5/32
[52] U.S. Cl. ..................................... 266/270; 266/225
[58] Field of Search ......................... 266/225, 226, 270

[56] References Cited

U.S. PATENT DOCUMENTS 4,083,541  4/1978  Berry et al. .......................... 266/225

Primary Examiner—L. Dewayne Rutledge
Assistant Examiner—Robert L. McDowell
Attorney, Agent, or Firm—Myers & Ehrlich, Ltd.

[57] ABSTRACT

An oxygen lance for steelmaking is provided with a top adapter assembly of generally T-shaped configuration including a central tubular barrel and a transverse top plate which both contain the O'rings required to assure complete adequate sealing between the oxygen gas and the cooling medium utilized in the furnace.

The O'rings are placed on the outside circumference of the central barrel and are held in place in grooves therein so that they cannot be accidentally displaced during oxygen blowing or during assembly and disassembly of the lance. Access to the O'rings is simplified and assured while maintaining complete sealing integrity of the T-shaped top plate and complete sealing reliability during operation. The T-shaped top plate carries the sealing O'rings in grooves provided in the tubular vertical barrel and in a transverse plate thus providing means whereby interchange of the bottom assembly in the lance combination is quickly achieved in the field or factory.

26 Claims, 7 Drawing Figures

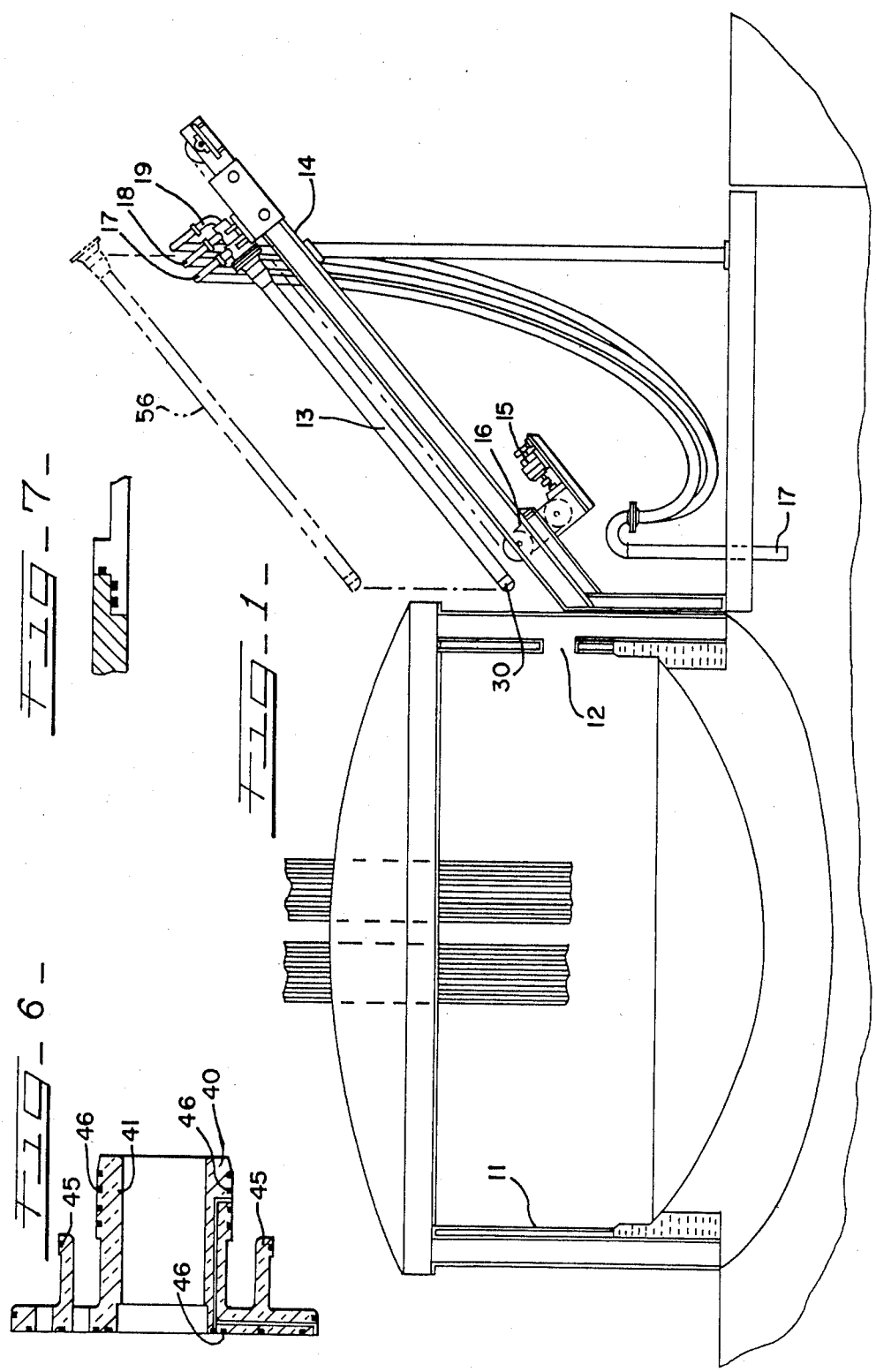

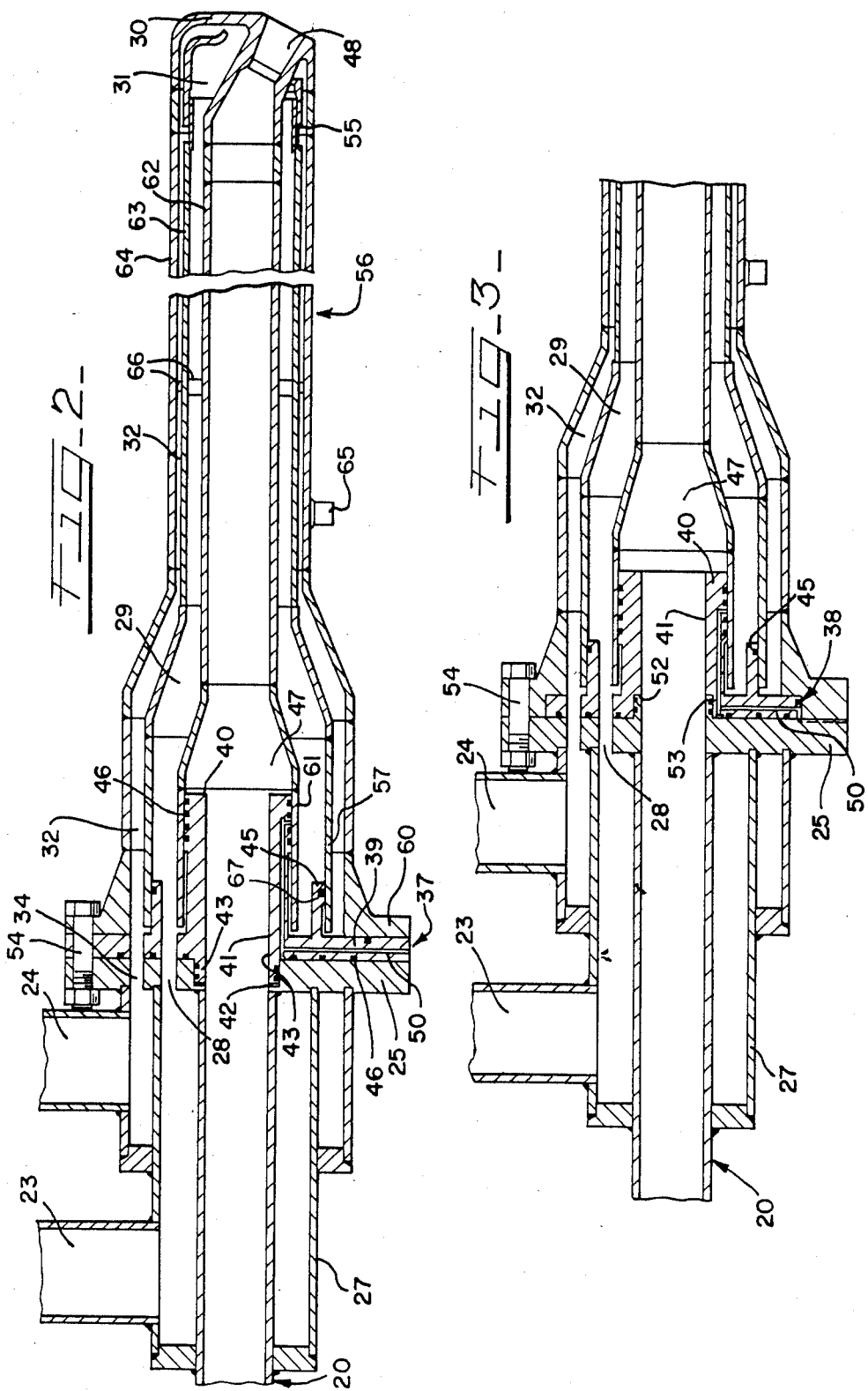

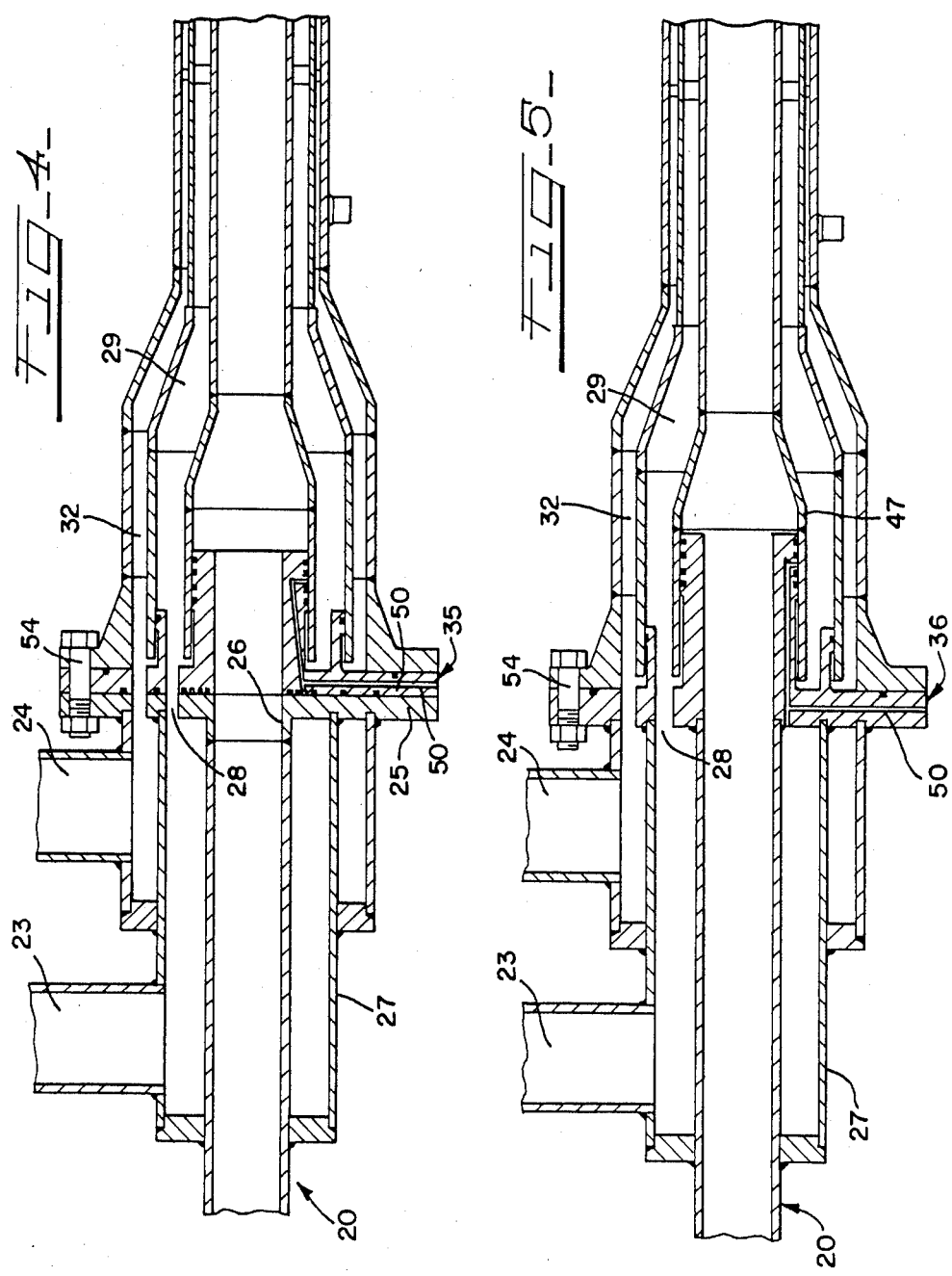

SELF CONTAINED DOUBLE O'RING SLIP JOINT AND QUICK DISCONNECT LANCE

BACKGROUND OF THE INVENTION

1. Field of the Invention

This invention relates to the art of steelmaking equipment. More particularly it relates to an improved oxygen injection lance for introducing oxygen into a steekmaking furnace without the intermixture of oxygen anywhere in the lance.

2. Description of the Prior Art

The prior art is exemplified in U.S. Pat. Nos. 3,827,632, 4,083,540, and others wherein the O'rings are in many instances positioned in the interior walls of the tubes as well as in the T-shaped heads. With this type of construction, placing the O'rings in the interior walls creates a blind assembly and the O'rings have a tendancy to slip and move out of position with resultant possible leakage of the pipes in relation to one another.

O'rings that are used as seals thus not only are difficult to position, and difficult to see during assembly, but also cause serious problems in assembly because of leakage or damage.

SUMMARY OF THE INVENTION

The present lance invention is of a type which is easily and quickly disconnected from a top support or head member carried by a lance carriage adjacent to a steelmaking vessel. The top head or support member is provided with a central oxygen pipe and water-inlet and outlet pipes which are connected to a suitable supply source. The gist of the present invention lies in a T-shaped connector assembly which includes the top plate having a central opening with an extending perpendicular tubular barrel. The central tubular barrel which depends from the transversely positioned top head is provided with O'rings. The O'rings are contained, in vertical spaced relation, on the outer cylindrical surface of the tubular barrel of the top plate. They engage in sliding and sealing relation the inner surfaces of the central tube which provides for the flow of oxygen to the lance nozzle. The T-shaped top head is also provided with a central downwardly projecting tube portion, encircling and laterally spaced from the oxygen pipe and having O'rings provided in its outer peripheral surface to effectively seal the oxygen pipe from the water circulating pipes. Essentially, therefore, the invention resides in the T-shaped connector which can easily be replaced and which contains the O'rings forming the positive sealing relationship between the oxygen and the water circulation pipes. Thus it provides for effective sealing between the pipes as well as permitting quick and rapid replacement of a single part which positively functions to seal the assembly. Thus the T-shaped connector with the O'rings positioned therein provide an effective quick change lance design wherein change-over with a minimum of effort and cost can be achieved. These and other advances of the present invention will be described as follows:

BRIEF DESCRIPTION OF THE DRAWINGS

FIG. 1 is a schematic drawing disclosing a B.O.F. vessel and an oxygen lance positioned for entry into the vessel in a steel making process;

FIG. 2 is an oxygen lance, in cross section disclosing a generally T-shaped connector plate adapted to seal the interior passages of an oxygen lance assembly;

FIG. 3 is a cross sectional view disclosing a modified lance having a T-shaped connector plate;

FIG. 4 is a cross sectional view of another modified lance design having a T-shaped connector plate;

FIG. 5 is another cross sectional view of a lance structure having another modified arrangement;

FIG. 6 is a cross sectional view of a T-shaped connector plate embodying the invention; and FIG. 7 is a view disclosing a modification of the connector plate disclosed in FIG. 6.

DESCRIPTION OF THE PREFERRED EMBODIMENT

Referring now particularly to FIG. 1, a steelmaking vessel 10 includes a vertical wall structure 11 which contains materials to be refined in the process of steel making. The vessel 10 is provided with an opening 12 which permits the insertion and removal of an oxygen lance 13, and specifically the oxygen lance bottom assembly 56. The lance 13 is supported on a fixed carriage 14 and is moved into the vessel 10 by means of a power unit 15 and driven assembly 16 adapted to reciprocate the lance to and from the bath to be refined in the process. A pipe structure 17 is connected to a coolant water supply comprising hoses 17 and 18 for circulating coolant through the lance. The oxygen source 19 is provided from the pipe structure and communicates with an oxygen lance structure 20 for delivering oxygen to the interior of the vessel.

The arrangements disclosed in FIGS. 2,3,4, and 5 have identical structures which are substantially identical in function and which will be generally described. The lances include water (coolant) inlet pipes 23 and water outlet pipes 24. In FIGS. 2, 3, and 4 the oxygen pipe 20 is rigidly connected to a main connector plate 25 which includes a central opening 26 providing for the passage of oxygen through the lance from the oxygen source. A concentric water pipe 27 is in communication with pipe 23 and water is permitted to flow through one or more openings 28 to an elongated coolant chamber 29, communicating with the nozzle tip 30 and providing a lower chamber 31 communicating with an elongated outlet chamber 32 communicating with outlet pipe 24. The connector plate 25 disclosed in FIG. 2 is provided with a coolant flow opening 34 for directing coolant liquid outwardly of the coolant chamber.

The invention resides in the self contained double "O" ring slip joint which in the present disclosure is designated by reference characters 36 in FIG. 4, 36 in FIG. 5, 37 in FIG. 2, and 38 in FIG. 3. Referring now particularly to FIG. 2 the embodiment of the invention includes a T-shaped member 37 which is formed of a flat plate 39 and a depending tubular barrel 40 having an oxygen passage 41. The oxygen pipe 20 connected to connector plate 25 which at its upper surface is provided with an annular recess 42. The T-shaped plate member 37 is provided with a reduced diameter extension 43 in which are secured O'rings 53 for effectively sealing the assembly. The T-shaped connector plate, or member 37 also is provided with a second barrel or tubular extension 45 projecting with the barrel 40 and being radially spaced therefrom. The depending barrel 40 of the T-shaped plate is also provided at its lower end and outer surfaces with O'rings 46 for slidingly sealing the upper slidable end of the oxygen pipe 47 having at its lower end a nozzle tip 48. It will be readily apparent that O'rings are provided in all surfaces of the T-shaped plate member where sealing is mandatory and where elongated contraction and expansion of the various pipes takes place during operation relative to the T-shaped member 37. The T-shaped connector plate or member 37 is also provided with vent passages 50 for venting leaks of oxygen or water to the atmosphere, the same being contained in the T-shaped member.

The bottom assembly 56 includes the T-shaped connector plate 37, lance tip 48, upper intermediate slip joint 57, lower intermediate slip joint 55, upper flanged connector 60, upper oxygen slip joint 61, central oxygen tube 62, intermediate water baffle 63, outer barrel 64, locating pin 65 and spacers 66.

The T-shaped member 38 disclosed in FIG. 3 is similar to the aforementioned embodiment of FIG. 2, with some differences in the vent passages 50. In FIG. 3, the tubular barrel 40 at its upper end is provided with and undercut or annular recess 52 and the plate 25 is provided with annular extension which contains the O'rings. With this exception all of the other O'rings are contained entirely in the T-shaped member.

The T-shaped connector assembly is of course connected together by suitable fasteners 54 as is conventional in the art.

FIG. 4 discloses another modification in that the T-shaped plate 35 has a somewhat different configuration for the vent openings 50 as well as the disposition of the O'rings in the surface of the T-shaped plate.

The modification 36 disclosed in FIG. 5 is essentially similar to the aforedescribed embodiments with the exception that the T-shaped plate is welded to the pipe and passage structure of the lance and stays in this position during disassembly. The structure of the O'ring placement is essentially the same and the features above mentioned remain.

OPERATION AND ADVANTAGES OF THE INVENTION

In the prior art double O'ring slip joints have always consisted of several pieces to make up the assembly. The purpose of this invention is to produce a self-contained double O'ring slip joint of one piece construction and totally contained in the bottom assembly 56 and to provide a complete disconnect of the bottom assembly at the T-shaped plate member 37 so that all O'rings are returned for an inspection or replacement.

When O'rings are used as seals, it is most essential that they be placed on the outside circumference so that they are easily held in place in the grooves and cannot slip or move out of their position when the part containing them is assembled into the main body of the lance and so they can be easily observed being compressed into their respective cylinders. O'rings that are located on the inside diameter are difficult to position and can slip out of position; creates a blind assembly into their cylinders, and cause serious problems on assembly. Many of the prior art patents disclose O'rings on the inside diameter. In the present invention the T-shaped plate or head contains all major O'ring seals in the central and outer barrels. Thus quick interchange of new plates and most effective sealing and assembly is achieved.

This new self-contained assembly is also designed so that when installed in a lance, it will be easily repairable. The lance top adapter may be permanently installed in the furnace carriage and the lance bottom assembly can be repaired and O'rings inspected or replaced by quick disconnection from the lance and simply plugging in a new repaired bottom assembly containing the self-contained double O'ring slip joint. Since only the T-shaped barrel assembly is replaced it is no longer necessary for the customer to have completed spare lances in inventory at all times. The design of the new self-contained double O'ring slip joint and the lance in which it is contained allows removal and replacement of a plug-in assembly with a minimum of clearance requirements.

In the present invention expensive and costly parts are mostly contained in the top adapter and the recoverable and repairable self-contained double O'ring slip joint assembly. These parts can be re-used and the bottom assembly of the lance when consumed can be discarded with a minimum loss.

In the present design the bottom assembly can also be returned over great distances to the factory with the self contained O'ring assembly intact and protected by the bottom assembly 56. The T-shaped adapter plates 35,36,37,38, can be repaired cleaned and inspected and returned to the steel mills in a new bottom assembly.

Another advantage of the double O'ring slip joint is to prevent interchangeable leakage between oxygen and water by providing a 100% safety factor through the use of two O'rings on each side of the vent to atmosphere.

If oxygen should leak past the first two O'rings, it will be vented to the atmosphere away from the furnace, rather than being forced to the water cooling system. If water leaks past the two O'rings on the water side, it will be vented to atmosphere through the same channel, rather than into the oxygen, and therefore interchangeable leakage between water and oxygen is prevented. Prior art double O'ring slip joints accomplished the same purpose but they were not self-contained in a single unit and they did not provide for quick disconnect of the lance barrel from the top adapter with a minimum clearance and did not allow for changing of the lance barrel while the lance is in the lance carriage on the furnace, nor did it provide an indexing feature to assure proper assembly of the lance barrel onto the top adapter; nor could they be changed in the field.

The self-contained double O'ring slip joint assembly is vented internally within and is therefore re-useable and has no dependence on other parts of the lance and is interchangeable with all lances designed to accept the self-contained double O'ring slip joint assembly.

In order to reduce costs of welding and assembly, the intermediate pipe separating the water-in from the water-out is not welded onto the bottom assembly of the lance, and therefore is easily removable and can be re-used. Its design provides for an automatic verification that the working length of the lance is correct. If the working length of the lance is too short, the floating intermediate pipe prevents re-assembly of the lance. If the working length of the lance is too long, the intermediate slip joint 57 will not visually engage the top O'ring 67 or the lower slip joint 55 and the oxygen tube will not visually engage the top O'rings 46.

The lance design incorporating the self-contained double O'ring slip joint allows for field repair by steel plant personnel with no welding experience because no welding is required to repair the lance if the T-shaped plug-in assembly is used.

The present invention allows the top adapter to remain at the plant of operation and reduces the cost of having to ship the entire lance back to the lance maker.

When the lance is disassembled, all critical O'ring seals are visable and easily inspected, replaced, and degreased.

The quick disconnect flange and the flange on the top adapter are sealed with O'rings rather than gaskets. This procedure also provides an immediate visual check of any leakage because water leaking past these O'rings will be visible either at the vent or at the interface of the flanges. By use of concentric reducers or by eliminating them, the lance can be made in virtually any diameter required for a steel-making furnace.

The steel-making operation of lances 13 is well described in the reference U.S. Pat. Nos. 3,620,455, 3,827,632, 4,083,539, 4,083,540, 4,083,541, 4,083,542, 4,083,543 and 4,083,540. The present invention basically discloses the advantages of a single top plate design which provides for the effective and positive seal quick disconnect and ease of repair of a lance utilized in the steel-making operation.

All of the seal elements are so disposed that all the supplier has to do is order the T-shaped top adapter assembly with replaced O'rings and by a quick and simple operation the lance can be repaired with all of the O'rings in proper position to effectuate repair. Thus the advantages of the invention are fully set forth.

What is claimed is:

1. A steelmaking lance assembly comprising a top support member having an upper connector plate including an upper oxygen pipe, an upper inlet water pipe, and an upper outlet water pipe disposed in concentric relation, an intermediate member including a top intermediate plate being connected with the top support member and having an upper surface and a lower surface, said upper surface engaging the upper connector plate;

a lower support member having a lower connector plate including a lower oxygen pipe, a lower inlet water pipe, and a lower outlet water pipe;

a lance connected with said lower connector plate and providing communication between said lower inlet water pipe and said lower outlet water pipe, said lance including a nozzle having an oxygen outlet in communication with said lower oxygen pipe, said intermediate plate having a central opening communicating with said upper and lower oxygen pipes, a water inlet passage communicating with said upper and lower inlet water upper and lower outlet water pipes;

said intermediate member having first and second first recesses therein spaced from each other; and first and second seal members each supported in a respective recess and engaging the lower connector plate for sealing the engagement of the intermediate plate with the lower connector plate by providing a double seal structure usable with a replacement lower support member without being transferred between parts of the lance assembly when the lower support member is replaced.

2. The invention in accordance with claim 1, and said top intermediate plate having a generally outward facing surface defining said recesses, and said seal members including O'rings being supported in said recesses in said top intermedaite plate and extending generally outwardly therefrom to engage the lower support member whereby said O'rings are secured against movement during assembly and disassembly of said lance assembly.

3. The invention in accordance with claim 1, and said top intermediate plate having vent opening in communication with the atmosphere and extending adjacent said seal member for releasing oxygen escaping past the seal to the atmosphere.

4. The invention in accordance with claim 1, and said top intermediate plate including a pair of radially spaced tubular projections providing communication for passage of coolant and oxygen respectively to said lower oxygen pipe and said lower inlet water pipe, said projections containing substantially all of the O'ring seals required for sealingly connecting said lower oxygen pipe and said lower inlet water pipe.

5. The invention in accordance with claim 1, and said top intermediate plate including a tubular projection in T-shaped configuration communicating with said lower oxygen pipe.

6. The invention in accordance with claim 5, and said tubular projection having a generally outwardly disposed outer surface defining said first and second recesses, and said seal members each comprising an O'ring supported in recess and extending outwardly therefrom to engage said lower oxygen pipe whereby each O'ring is secured on said outer surface of the projection to prevent movement thereof when the lower support member engaged with and disengaged from the intermediate member.

7. The invention in accordance with claim 5, and said top intermediate plate including upwardly extending second tubular projection, and said upper connector plate having a generally annular recess therein receiving the second tubular projection, and said second tubular projection having sealing means for sealing the engagement of the second projection with the top intermediate plate.

8. The invention in accordance with claim 7, and said second tubular projection having openings therein;
said sealing means including O'rings disposed within said openings in said second tubular projection.

9. The invention in accordance with claim 3, and said top intermediate plate including a second tubular projection co-extending with said first projection.

10. The invention in accordance with claim 9, and O'ring sealing means supported on said co-extending second tubular projection.

11. The invention in accordance with claim 10, and said O'ring sealing means facing generally radially outwardly of said second tubular projection.

12. The invention in accordance with claim 3, and said top intermediate plate including an annular undercut recess, and
said upper oxygen pipe including an annular projection disposed within said recess,
and O'ring seals disposed in said annular projection for sealing engagement with the top intermediate plate.

13. The invention in accordance with claim 3, and said tubular projection having a first vent passage therein and the top intermediate plate having a second vent passage communicating with said first vent passage extending in said top intermediat plate to the atmosphere.

14. The invention in accordance with claim 13, and sealing member being disposed in said top intermediate plate.

15. A steel making lance assembly comprising:
a top support member having an upper connector plate including an upper connector plate including an upper oxygen pipe, an upper inlet water pipe, and an upper outlet water pipe disposed in concentric relation;
said upper connector plate having a lower surface;
a top intermediate plate connected with said top support member, said top intermediate plate having upper and lower surfaces, said upper surface engaging the lower surface of the upper connector plate;
the top intermediate plate having an oxygen passage, a water inlet passage, and a water outlet passage therein communicating with the upper oxygen pipe, the upper inlet water pipe, and the upper outlet water pipe, respectively; and
said top intermediate plate having a first generally tubular projection connected with the lower surface thereof and extending generally downwardly therefrom;
said projection having a generally outwardly facing surface portion;
a lower support member including a lower connector plate having an upper surface engaging the lower surface of the top intermediate plate;
said lower connector plate having a lower oxygen pipe, a lower inlet water pipe, and a lower outlet water pipe communicating with the oxygen passage, the water inlet passage, and the water outlet passage respectively;
a lance supported on the lower connector plate;
said lance including a nozzle having an oxygen outlet communicating with the lower oxygen pipe whereby oxygen may be caused to flow through said upper oxygen pipe, said oxygen passage, said lower oxygen pipe, and through said oxygen outlet;
said lance having a connecting passage therein communicating with the lower inlet water pipe and the lower outlet water pipe whereby coolant may be caused to flow through said upper inlet water pipe, said water inlet passage, said lower inlet water pipe, said connecting passage, said lower outlet water pipe, said water outlet passage, and into said upper outlet water pipe;
said lower oxygen pipe having a generally inwardly facing surface portions therein;
said projection extending within said lower oxygen pipe to provide communication between said oxygen passage, said interior space, and said lower oxygen pipe; and
said generally outwardly facing surface portion of the projection having sealing means supported thereon, said sealing means engaging the generally inwardly facing surface portion of the lower oxygen pipe for sealing engagement of the projection with the lower oxygen pipe whereby said sealing means is readily re-used when a replacement lower support member is substituted for the lower support member.

16. The invention according to claim 15, and
said outwardly facing surface portion of the projection having a first receiving portion defining a first generally outwardly disposed recess;
said sealing means including a first sealing member;
said first sealing member extending within and being supported in said first recess in said projection for securing the first sealing member in supportive engagement with the projection.

17. The invention according to claim 16, and
said sealing means including a second sealing member;
said outwardly facing surface portion of the projection having a second receiving portion defining a second generally outwardly disposed recess therein displaced upwardly from the first recess, said second sealing member extending within said second recess for securing the second sealing member in engagement with the projection whereby a double seal is provided to enhance the sealing engagement of the projection with the lower oxygen pipe.

18. The invention according to claim 17, and
said first and second receiving portions extending substantially around the projection and defining said first and second recesses extending substantially around the projection to enhance the sealing engagement of the projection with the lower oxygen pipe; and
said first and second sealing member each comprising an O'ring seal.

19. The invention according to claim 15, and
a second generally tubular projection connected with the lower surface of the top intermediate plate and extending generally downwardly therefrom;
said second projection being disposed generally outwardly from said first projection and defining a space therebetween, said space communicating with the water inlet passage and with the lower inlet water pipe;
said lower inlet water pipe having an inward surface portion;
said second projection extending within the lower inlet water pipe and engaging said inward surface portion of said lower inlet water pipe in sealing engagement.

20. The invention according to claim 19, and
said second projection having;
an outwardly facing surface portion defining a recess therein, and
a seal member extending within and supported within said recess and engaging the inward surface portion of the lower inlet water pipe for sealing the engagement of the second projection with the lower inlet water pipe and whereby the seal member is re usable with a replacement lower support member without detachment from the assembly.

21. The invention according to claim 20, and
said seal member extending substantially around the second projection.

22. The invention according to claim 19, and
said first projection extending downwardly beyond the second projection to allow an operator to visually observe and ensure engagement of the first projection with the lower oxygen pipe.

23. A steelmaking lance apparatus, comprising:
a top support member including an upper connector plate having a generally downwardly facing upper connecting surface;
an intermediate support member having a generally upwardly facing lower connecting surface sealingly engaged with said upper connecting surface; and a lower support member having a lower connector plate engaging said intermediate support member;

said upper connector plate having an upper oxygen pipe, an upper inlet water pipe, and an upper outlet water pipe disposed in generally concentric relation;

said intermediate support member having an oxygen passage, a water inlet passage and a water outlet passage communicating with the upper oxygen pipe, the upper inlet water passage, and the upper outlet water pipe, respectively;

said lower connector plate having a lower oxygen pipe, a lower inlet water pipe, and a lower outlet water pipe, communicating with said oxygen passage, said water inlet passage, and said water outlet passage respectively for receiving oxygen and water from the top support member;

said lower support member including a lance member, said lance member including an outlet nozzle communicating with the lower oxygen pipe for introducing oxygen into a steelmaking vessel;

said lance member further including communication means for providing communication between the lower inlet water pipe and the lower outlet water pipe whereby coolant may flow therebetween for cooling the apparatus;

one of said connecting surfaces having a projection extending therefrom, said projection having a generally outward surface; and the other of said connecting surfaces defining a recess therein the receiving projection therein;

said projection having seal means supported on the generally outward surface and engaging the recess for sealing the engagement of said connecting surfaces.

24. The invention according to claim 23 and said projection being positioned generally inwardly of the upper inlet water pipe and inlet water passage, and outwardly of the upper oxygen pipe and oxygen passage to seal against escape of oxygen from the upper oxygen pipe to the upper inlet water pipe.

25. The invention according to claim 23 and said outward surface of said projection having first and second spaced recesses therein, and said sealing means including a first and second O'ring members each supported in a respective recess and engaging said other of said connecting surfaces whereby the engagement of the said connecting surfaces is sealed by a double seal arrangement.

26. The invention according to claim 23 and said projection being on said lower connecting surface, whereby the seal means may be replaced by use of a replacement intermediate plate having a replacement seal means.

* * * * *